US012428189B2

(12) United States Patent
Shourvarzi et al.

(10) Patent No.: US 12,428,189 B2
(45) Date of Patent: Sep. 30, 2025

(54) METHOD OF MANUFACTURING A MARK ON A PACKAGING MATERIAL

(71) Applicant: Tetra Laval Holdings & Finance S.A., Pully (CH)

(72) Inventors: Keyvan Shourvarzi, Lund (SE); Stefan Nyborg, Lund (SE); Maria Aldenius, Lund (SE)

(73) Assignee: Kiekert AG, Heiligenhaus (DE)

(*) Notice: Subject to any disclaimer, the term of this patent is extended or adjusted under 35 U.S.C. 154(b) by 0 days.

(21) Appl. No.: 18/708,784

(22) PCT Filed: Nov. 24, 2022

(86) PCT No.: PCT/EP2022/083164
§ 371 (c)(1),
(2) Date: May 9, 2024

(87) PCT Pub. No.: WO2023/099335
PCT Pub. Date: Jun. 8, 2023

(65) Prior Publication Data

US 2025/0019110 A1 Jan. 16, 2025

(30) Foreign Application Priority Data

Dec. 3, 2021 (EP) .................................... 21212336

(51) Int. Cl.
*B65B 61/02* (2006.01)
*B41J 2/44* (2006.01)
*B41M 5/24* (2006.01)

(52) U.S. Cl.
CPC ............. *B65B 61/025* (2013.01); *B41J 2/442* (2013.01); *B41M 5/24* (2013.01)

(58) Field of Classification Search
None
See application file for complete search history.

(56) References Cited

U.S. PATENT DOCUMENTS

2021/0292027 A1* 9/2021 Bergholtz .......... B23K 26/0846

FOREIGN PATENT DOCUMENTS

EP 3452374 A1 3/2019
WO WO-2015192930 A1 * 12/2015 ............ B41J 29/393

(Continued)

OTHER PUBLICATIONS

International Search Report mailed Feb. 21, 2023, for International Application No. PCT/2022/083164.

*Primary Examiner* — Tanzim Imam
(74) *Attorney, Agent, or Firm* — Renner, Otto, Boisselle & Sklar, LLP

(57) ABSTRACT

A method of manufacturing a mark on a packaging material, the method comprising the following steps: Providing the packaging material, which comprises at least one pre-printed element at a pre-defined position; Removing the pre-printed element in pre-defined sections in a marking station, so that the removed sections reflect a negative of the mark to be manufactured; Detecting a reference geometry of the pre-printed element and a reference geometry of the manufactured negative of the mark; Determining a geometric relationship of the detected reference geometries; Evaluating, if the determined geometric relationship matches a pre-defined geometric relationship; and if it matches, manufacturing subsequent marks under removal of the pre-printed element in the same pre-defined sections; or if it does not match, manufacturing subsequent marks under adjustment of the pre-definition of the sections, wherein the pre-printed element is removed. The present disclosure further refers to a respective marking station and a packaging material manufacturing system, as well as, a packaging material and a packaging container.

13 Claims, 3 Drawing Sheets

(56) References Cited

FOREIGN PATENT DOCUMENTS

| | | | | | |
|---|---|---|---|---|---|
| WO | 2017190962 | A1 | | 11/2017 | |
| WO | WO-2020008047 | A1 | * | 1/2020 | ......... B23K 26/0604 |

* cited by examiner

*Fig. 2*
Almond milk
PURE ALMOND
Rich of calcium and vitamins
High in vitamins
No saturated fat or cholesterol
Organic &healthy
1000 ml e
18;
20
16

METHOD OF MANUFACTURING A MARK ON A PACKAGING MATERIAL

TECHNICAL FIELD

The invention relates to a method of manufacturing a mark on a packaging material and to a marking station to manufacture a mark on a packaging material. The invention further relates to a packaging material manufacturing system comprising a marking station, as well as to a packaging material and to a packaging container formed therefrom.

BACKGROUND ART

Packaging containers of the single use disposable type for liquid or semi-liquid foods are often produced from a packaging material based on paperboard or carton. The packaging material of this known packaging container is typically manufactured as a laminate comprising a bulk layer of paper or paperboard and outer, liquid-tight layers of thermoplastics.

On the inside of the laminate, i.e. the side intended to face the filled food contents of a packaging container produced from the laminate, there is one or more inner layers comprising heat sealable thermoplastic polymers.

The appearance of packaging containers manufactured from the above-described packaging material is dependent on a décor printed on an outer layer of the packaging material, forming an exterior side of the packaging container. The printed décor is conventionally applied by means of high-speed flexography processes. These printing processes are designed for high-speed printing of wide substrate webs of several meters in e.g. packaging material manufacturing plants.

For every color to be printed by flexography, a printing plate is made and mounted on the circumference of a rotatable printing cylinder. For packaging material manufacturing, the printing plate contains a repeat of the pattern to be printed. The repeat length, which equals the circumference of the printing cylinder when the printing plate is mounted thereto, may typically correspond to 3-6 packaging container prints and may vary e.g. between 450 and 800 mm.

The width of the printing plate is typically selected so that a décor is printed on multiple lanes at the same time; each lane will eventually be separated and used in a packaging container manufacturing machine. Hence, the web of packaging material entering the flexography process will be provided with a repetitive printed pattern, each printed pattern being designed for a single packaging container to be produced.

In order to increase printing speed the printing plate width may correspond to twelve lanes. Consequently, as the printing plate is performing one revolution the packaging material will be provided with a printed pattern on an area corresponding to up to 12*6 packaging containers to be produced.

The configuration of the printing plate is static, which means that the printed pattern will be the same for all packaging containers being produced using the same printing plate. For that reason, it may be referred to as a static print herein.

However, during recent years it has been suggested to also provide a dynamic print on the packaging material which can be accessed by a consumer of the produced packaging containers. As one example, the dynamic print can be a two-dimensional code containing specific information.

Such dynamic prints cannot be obtained using existing flexography processes due to its repetitive character. Instead it has been suggested to provide a separate printing station downstream the flexography processing equipment. The separate printing station is capable of providing unique prints inline, e.g. by implementing inkjet technology, thereby allowing unique two-dimensional codes or other dynamic objects to be printed at areas of the packaging material; typically, each final packaging container will have a dynamic print.

The position of the dynamic print, i.e. the pattern printed by the separate printing station, must be in register such that it is aligned with the print of the flexography process. In order to allow readability of the dynamic print the flexography design may include a specific area, which typically is non-printed or provided with a specific background color, for accommodating the dynamic print. Should the position of the dynamic print be misaligned, there is a great risk that correct reading of the dynamic print is made impossible or at least made more difficult. The misaligned dynamic print may also have negative impact on visual quality of the dynamic print and/or the flexography design.

Correct positioning of the dynamic print is affected by several parameters. One important factor is that the packaging material may be subject to changes in dimensions as it travels through the packaging material manufacturing plant, and especially through the décor printing equipment including the separate printing station. For example, wrinkles may be present which will possibly require adjustment of the position of the dynamic print. Another issue that will affect packaging material web dimensions is humidity, and moisture content of the packaging material. Especially thin packaging materials will expand and retract laterally as the moisture content changes, e.g. due to drying heat applied immediately after the flexography process. Due to the considerably large web width, as previously mentioned up to 12 lanes, any variations in packaging material width may cause faulty positioning of the dynamic print, especially at the outer lanes. A further factor that needs to be considered is lateral movement of the web of packaging material. Such movement is commonly known as snaking, and causes small shifts of the lateral positioning of the entire web of packaging material.

All these factors will possibly affect the positioning of prints relative the décor of the packaging material.

There is thus a need for an improved method and system for creating such prints, which ensure correct positioning and readability of a printed pattern in relation to already-present features on the packaging material, even if the dimensions or the position of the packaging material will vary during production.

SUMMARY

It is now an objective of the present invention to at least partly overcome one or more of the above-identified limitations of the prior art. In particular, the present invention aims at providing a method of manufacturing a dynamic marking element on a packaging material at low technical effort, which assures readability and position accuracy at the same time.

To achieve these objectives, a first aspect of the invention refers to a method of manufacturing a mark on a packaging material, the method comprising the following steps:

Providing the packaging material, which comprises at least one pre-printed element at a pre-defined position;

- Removing the pre-printed element in pre-defined sections in a marking station, so that the removed sections reflect a negative of the mark to be manufactured;
- Detecting a reference geometry of the pre-printed element and a reference geometry of the manufactured negative of the mark;
- Determining a geometric relationship of the detected reference geometries;
- Evaluating, if the determined geometric relationship matches a pre-defined geometric relationship; and
- if it matches, manufacturing subsequent marks under removal of the pre-printed element in the same pre-defined sections; or
- if it does not match, manufacturing subsequent marks under adjustment of the pre-definition of the sections, wherein the pre-printed element is removed.

The invention is summarized again in other words as follows: As an input to the method of the invention, a packaging material is provided. The packaging material comprises a static print, for example as described in the introduction. As the position, orientation and shape of the static print are known, the marking station can remove the static print in a pre-defined area. The packaging material underlying the static print is thereby revealed in the sections, wherein the static print is removed and these sections then represent a negative of a dynamic print as for example described in the introduction. This negative of the dynamic print is thus placed inside the static print.

Based on disturbing influencing factors that may influence the actual position and orientation of the static print, the negative of the dynamic print may not be placed accurately in the static print as intended. If this is the case can be determined by a comparison of a relative arrangement of reference geometries of the static print and the negative of the dynamic print to a pre-defined relative arrangement. For example, edges of the static print that may form a corner of the static print are detected. The same is for example done for the negative of the dynamic print, which means edges of the negative of the dynamic print that form a corner of the negative of the dynamic print are detected, as well.

If the relative arrangement of the negative of the dynamic print and the static print is correct, the said exemplary corners and edges actually have a pre-defined relative arrangement.

If the relative arrangement of the negative of the dynamic print and the static print is however not correct, said exemplary corners and edges show deviations in their relative arrangement compared to the pre-defined relative arrangement. In case of such deviations, a correction can be calculated to compensate for disturbing influencing factors in subsequent manufacturing steps, so that the actual relative arrangement is made matching the pre-defined relative arrangement in the manner of a closed-loop control.

This way the method of the invention assures in an easy and stable manner that the mark is correctly manufactured on the packaging material.

Preferably, the packaging material comprises a cellulose based material, such as paper. Preferably, the packaging material comprises a paper board and even more preferred, the packaging material consists of paper or paper board besides other materials required for the pre-printing. Preferably, the packaging material introduced to the method of the invention is a single layer packaging material besides other layers required for the pre-printed element. This means, the packaging material may be further processed later on as described in the introduction, for example by application of further layers such as sealing layers, after the mark has been manufactured.

The pre-printed element features a color different from that of the underlying packaging material, which is essential for visual detectability and readability of the manufactured mark. Preferably, the pre-printed element may be part of a décor printed on the packaging material. Preferably, the pre-printed element and the underlying packaging material feature colors of high contrast with each other, for example black and white, which further improves detectability and readability of the mark. Preferably, the pre-printed element is black and the underlying packaging material is white at least in the area, wherein the pre-printed element is applied.

In an embodiment of the method of the invention, subsequent marks are manufactured at least until the determined geometric relationship matches the pre-defined geometric relationship.

This way, disturbing influencing factors are compensated for in a process safe manner and a variety of high-quality marks can be manufactured, for example in a flow manufacturing process.

In an embodiment of the method of the invention, a camera is used to detect the reference geometry of the pre-printed element and the reference geometry of the manufactured negative of the mark.

A camera is particularly suitable to perform the detection in a flow manufacturing process and without contacting the (sensitive) surface of the packaging material. The camera is also suitable to perform additional detection tasks simultaneously. The camera may, for example, be a line scan camera.

With this said, in an embodiment of the method of the invention, the same camera is used to evaluate at least one additional pre-defined quality feature of the manufactured mark.

Preferably, the additional defined quality feature comprises readability of the information represented by the mark.

Based on that, multiple quality assurance tasks can be performed simultaneously at low technical effort.

In an embodiment of the method of the invention, the manufactured mark comprises a two-dimensional code.

Such codes are for example known as barcodes or QR codes and may encode information on the packaging material during manufacturing or further life cycle. The information may also refer to a product to be packaged by the packaging material later on.

In an embodiment of the method of the invention, the additional pre-defined quality feature comprises readability of information represented by the two-dimensional code.

In an embodiment of the method of the invention, the determined geometric relationship comprises detected information regarding a relative position and/or a relative orientation of the reference geometries and the pre-defined geometric relationship comprises pre-defined information regarding the relative position and/or the relative orientation of the reference geometries.

Based on the present disclosure, a person skilled in the art will be allowed to decide on suitable reference geometries and their geometric relationships to assess a desired quality feature. This also depends on the shape of the pre-printed element and the mark. For example, if both the pre-printed element and the mark comprise the shape of a square and if the mark should be placed in the center of the pre-printed element, it would for example be suitable to select two edges forming a corner of each the mark and the pre-printed element as reference geometries. In this example, the desired/pre-defined geometric relationship may be that the corner of the mark has a certain relative position from the corner of the pre-printed element. Further, it may be a pre-determined geometric relationship that the edges of the mark run parallel the edges of the pre-printed element. The number of reference geometries and geometric relationships looked at is not limited and may be adapted by the skilled person depending on the given mark to be manufactured and with respect to the given pre-printed element.

In general and merely as examples, the respective reference geometry of the mark and the pre-printed element may comprise an edge line, a corner, a center point, a center of area or combined elements, such as an angle between two straight lines forming edges or elements arranged as a pattern. As typical geometric relationships with regard to relative position and/or orientation of the mark and the pre-printed element, a distance between lines or points, parallelism or angles between lines or positions of centers of area can be exemplarily enumerated.

In an embodiment of the method of the invention, the reference geometries of the pre-printed element and the manufactured negative of the mark are of the same geometrical type.

This is particularly beneficial to calculate the geometric relationship between the reference geometries. For example, if both the mark and the pre-printed element feature a reference geometry in the form of a corner or edge formed by a straight lines, the distance between the edge or corner of the mark and of the pre-printed element can be easier calculated than in a case wherein for example the mark has an edge formed by a curved line and the pre-printed element has an edge formed by a straight line. However, it shall be understood that reference geometries of different types still enable for carrying out the present invention.

In an embodiment of the method of the invention, removing the pre-printed element in the pre-defined sections is performed by laser ablation.

Laser ablation provides several benefits with regard to speed and accuracy. Further, the packaging material is not exposed to any risk of mechanical damage, if laser is used. Normally laser ablation leads to sublimation of the removed material and so there is no cut-off material that needs to be collected in addition.

In an embodiment of the method of the invention, at least one element is pre-printed on the packaging material in a packaging material manufacturing system and then the packaging material comprising the pre-printed element is provided to the marking station.

With exemplary reference to the introduction, this allows for manufacturing the packaging material, including for example a décor as a static print and a two-dimensional code as a dynamic (negative) print, in a continuous flow manufacturing process. The method may be integrated with additional manufacturing steps, for example application of further layers of the packaging material and forming of a packaging container.

Based on the combination of the camera for detection purposes and laser ablation for the purpose of removing the material of the pre-printed element, high velocities of about 600 m/min can be achieved in a flow manufacturing process.

Another aspect of the invention refers to a marking station, adapted and configurable to manufacture a mark on a packaging material in a method of the invention according to the present disclosure.

Yet another aspect of the invention refers to a packaging material manufacturing system, comprising a marking station of the invention according to the present disclosure and being adapted and configurable to execute a method of the invention according to the present disclosure.

In an embodiment of the packaging material manufacturing system of the invention, the system further comprises a décor printing station adapted and configurable to pre-print at least one element at a pre-defined position on a packaging material.

Yet another aspect of the invention refers to a packaging material marked in a method of the invention according to the present disclosure and/or marked by a marking station of the invention according to the present disclosure and/or manufactured by a packaging material manufacturing system of the invention according to the present disclosure.

And still another aspect of the invention refers to a packaging container, comprising a packaging material of the invention according to the present disclosure.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
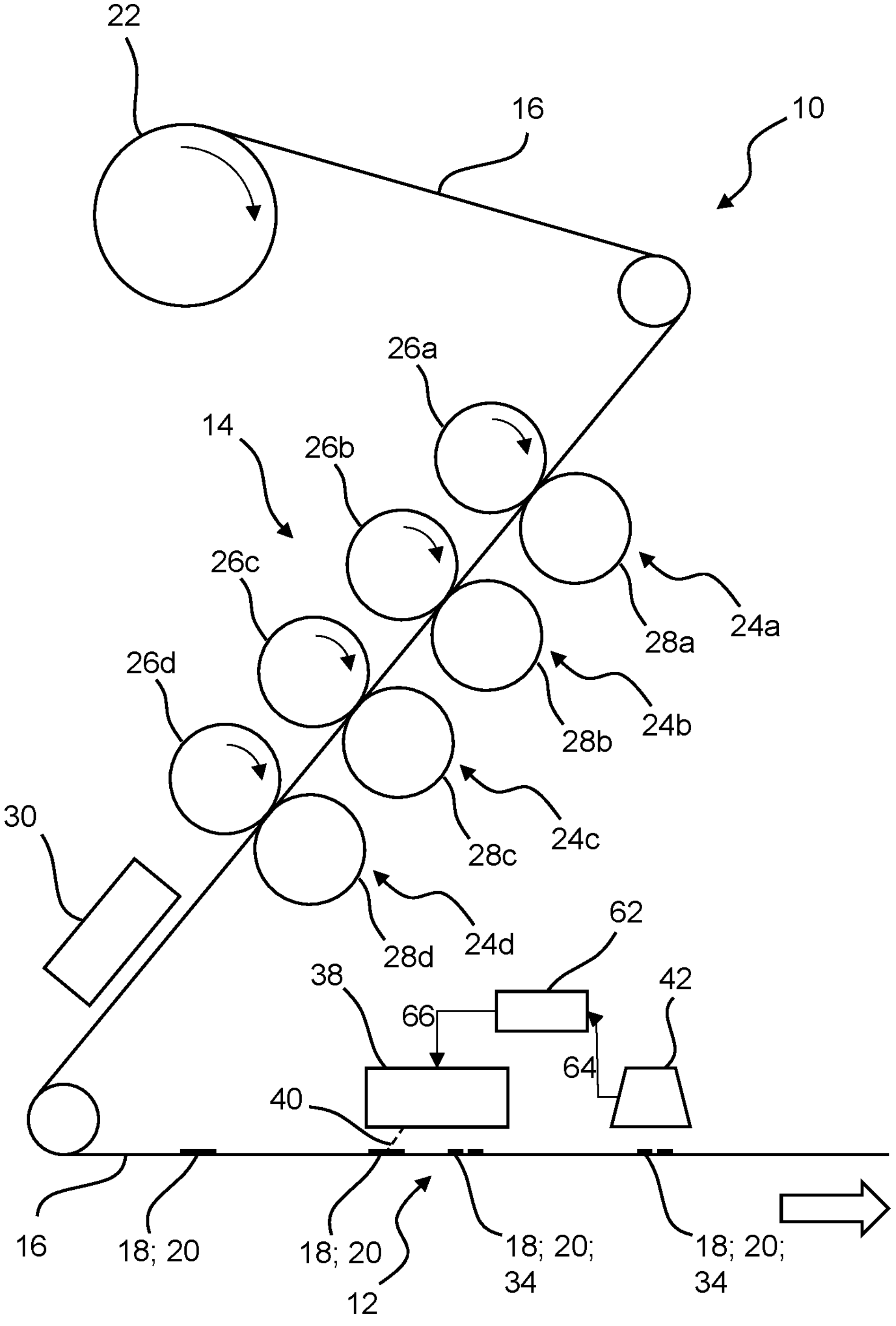
FIG. 1 shows a packaging material manufacturing system.

With reference to FIG. 1, a packaging material manufacturing system 10 is shown. The packaging material manufacturing system 10 comprises a marking station 12 and exemplarily a décor printing station 14 upstream the marking station 12. The packaging material manufacturing system 10 is adapted and configured to provide a packaging material 16 with at least one pre-printed element 18 at a pre-defined position 20 to the marking station 12.

In this embodiment and merely as an example, the packaging material manufacturing system 10 is also adapted and configured to pre-print the at least one element 18 at the pre-defined position 20 on the packaging material 16 by the décor printing station 14, before the packaging material 16 is supplied further to the marking station 12. Preferably, the pre-printing is performed as a static print process and thus the position 20 is pre-defined and multiple elements 18 are pre-printed. However, it is also possible that the packaging material 16 is already provided with the pre-printed element(s) 18 and for example supplied to the marking station 12 from a storage 22 without additional pre-printing. In such cases, a sensor may be applied to detect the pre-defined position 20 of one or more pre-printed elements 18 upon supply of the packaging material 16 from the storage 22, for example.

For the purpose of pre-printing the at least one element 18 in the illustrated embodiment, however, the packaging material manufacturing system 10 comprises a storage 22 adapted to supply a plain packaging material 16. The packaging material 16 may be stored and supplied in the form of a web of packaging material 16 that may be wound on a roll as the storage 22.

The packaging material 16 may be fed continuously through the packaging material manufacturing system 10 in the direction of the block arrow in the lower right of FIG. 1. The web of packaging material 16 preferably comprises at least one layer made of a cellulose based material, such as paper.

The décor printing station 14 is preferably a flexo printing system, comprising a series of flexo printing units 24*a-d*. Each flexo printing unit 24*a-d* comprises a plate cylinder 26*a-d* and an impression cylinder 28*a-d*. Each plate cylinder 26*a-d* and an associated impression cylinder 28*a-d* are forming a nip, through which the packaging material 16 is fed, thereby transferring ink from the plate cylinder 26*a-d* to the packaging material 16. In the shown example, four flexo printing units 24*a-d* are shown. Each flexo printing unit 24*a-d* may be responsible for a specific color; in one example, the flexo printing units 24*a-d* provide each one of the CMYK color scheme. Each flexo printing unit 24*a-d* may comprise additional components, such as anilox rollers and fountain rollers, as is well known in the art.

The décor printing station 14 may optionally be provided with a drying unit 30. The drying unit 30 is arranged downstream the flexo printing units 24*a-d*. The drying unit 30 may operate by providing infrared (IR) radiation or hot air to the packaging material 16, thereby drying the ink on the packaging material 16.

It should be noted that the décor printing station 14 may not necessarily be a flexo printing system, but other well-known techniques may be used as well for providing one or more pre-printed elements 18 to the packaging material 16.

Once the packaging material 16 is provided with the pre-printed element 18, for example a décor, it is passed on to the marking station 12.

Figure 2:
FIG. 2 shows a photograph of a packaging material being provided with a pre-printed element and introduced to a method of manufacturing a mark on the packaging material.
Figure 3:
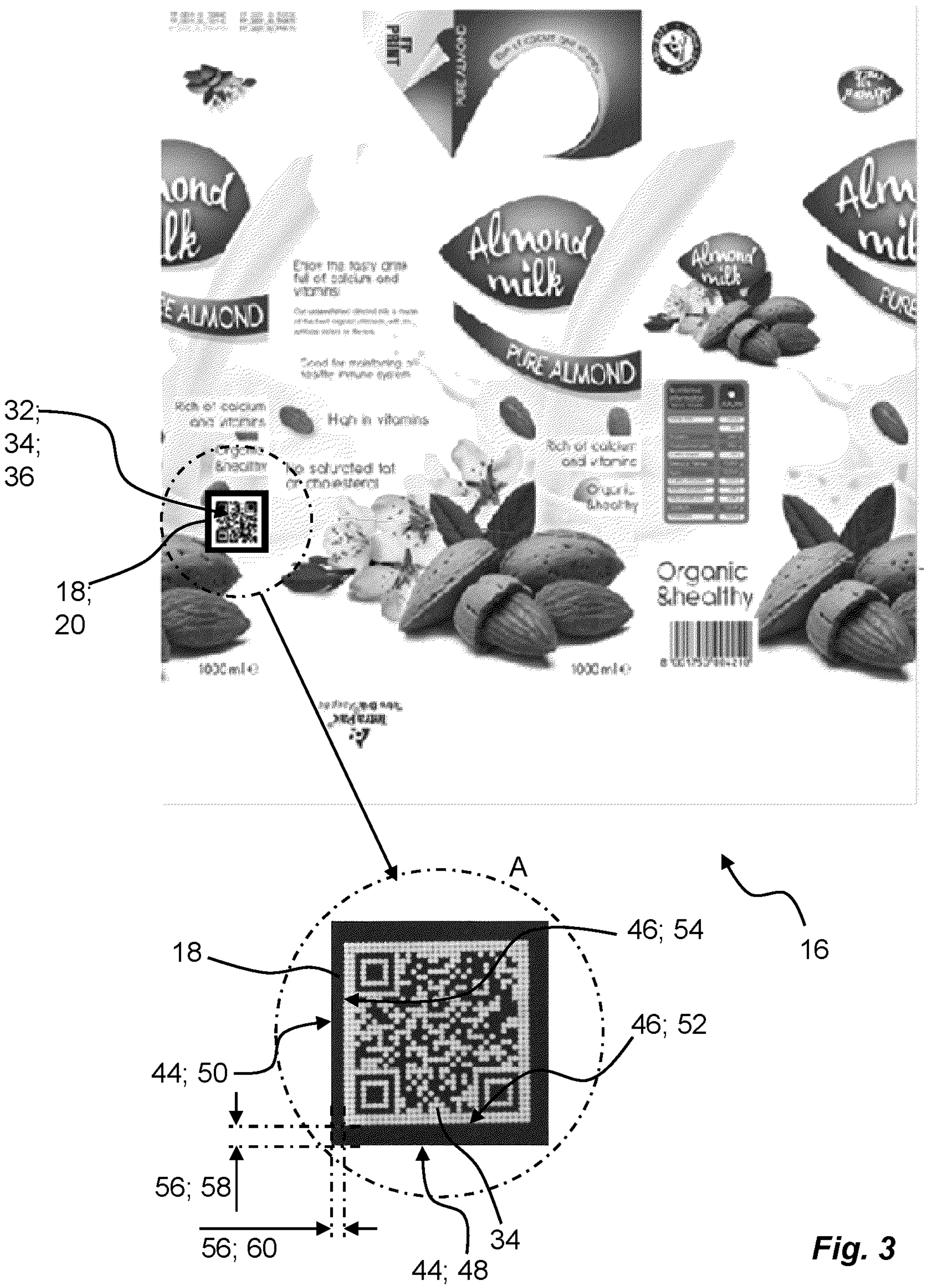
FIG. 3 shows the packaging material from FIG. 2 with the mark manufactured thereon.

Now making additional reference to FIGS. 2 and 3, the marking station 12 is adapted and configured to manufacture a mark 34 on the packaging material 16 in an inventive method, which essentially comprises the following steps:

In a first step, the packaging material 16, which comprises the at least one pre-printed element 18 at the pre-defined position 20 as shown in FIG. 2, is provides as an input to the marking station 12. The packaging material 16 shown in FIG. 2 is illustrated in sections but may be a continuous web of packaging material 16, for example periodically repeating the shown pre-printed element 18 and a décor, wherein the pre-printed element 18 is exemplarily embedded. It shall be understood, that the décor is preferably periodically repeated and that the pre-printed element 18 is preferably printed integrally with the décor or forms a part of the décor. In the shown example, the pre-printed element 18 comprises a black square.

In a second step, the pre-printed element 18 is removed in pre-defined sections 32 in the marking station 12. This way, in the removed sections 32, a negative of the mark 34 to be manufactured becomes visible, as shown in FIG. 3. Exemplarily, this is achieved because the material of the packaging material 16 underlying the black square is of white color. However, these are just examples and the packaging material 16 and the pre-printed element 18 may also have different colors, as long as the colors feature at least some contrast.

In the illustrated example, the manufactured mark 34 comprises a two-dimensional code 36, for example a QR code.

Removal of the pre-printed element 18 in the pre-defined sections 32 is exemplarily but preferably performed by laser ablation. For this purpose, the marking station 12 shown in FIG. 1 may comprise a laser unit 38 sublimating material of the pre-printed element 18 by a laser beam 40. This is exemplarily shown at the pre-printed element 18 located at the laser beam 40 in FIG. 1, which corresponds to the pre-printed element 18 in FIG. 2 right before the laser ablation. After laser ablation, the mark 34 has been manufactured and so the pre-printed element 18 corresponds to that in FIG. 3, which is shown behind the laser beam 40 in FIG. 1, respectively.

In a third step, making reference to FIGS. 1 and 3, a reference geometry 44 of the pre-printed element 18 and a reference geometry 46 of the manufactured negative of the mark 34 are detected. For the detection, the marking station 12 may preferably comprise a camera 42, as shown in FIG. 1. Detail A in FIG. 3 illustrates a picture of the pre-printed element 18 and the mark 34 located below the camera 42, which is captured by the camera 42.

Turning to FIG. 3, it can be seen that in the present example the reference geometry 44 of the pre-printed element 18 comprises a horizontal edge 48 and a vertical edge 50. Likewise, the reference geometry 46 of the manufactured negative of the mark 34 comprises a horizontal edge 52 and a vertical edge 54 in this example. This means, the reference geometries 44, 46 of the pre-printed element 18 and the manufactured negative of the mark 34 are of the same geometrical type in this example, which is beneficial for the following steps.

In a fourth step, a geometric relationship 56 of the detected reference geometries 44, 46 is determined, which is easier, if these are of the same geometrical type, as stated above.

Preferably, the determined geometric relationship 56 comprises detected information regarding a relative position and/or a relative orientation of the reference geometries 44, 46. Based on the above example and on the one hand, the determined geometric relationship 56 is detected between the horizontal edge 48 of the pre-printed element 18 and the horizontal edge 52 of the mark 34 in the form of a distance 58. On the other hand, the determined geometric relationship 56 is detected between the vertical edge 50 of the pre-printed element 18 and the vertical edge 54 of the mark 34 in this example in the form of a distance 60. Based on this, the relative position of the mark 34 and the pre-printed element 18 as a whole can be derived as the geometric relationship 56, as both the mark 34 and the pre-printed element 18 are in the shape of a square of a known size. Though not illustrated, it is possible to take into account further measures to describe the geometric relationship 56, for example angles between the horizontal edges 48, 52. This way, also the relative orientation of the mark 34 and the pre-printed element 18 can be assessed to determine the geometric relationship 56.

In a fifth step, the determined geometric relationship 56 is evaluated, whether it matches a pre-defined geometric relationship. The pre-defined geometric relationship preferably comprises pre-defined information regarding the relative position and/or the relative orientation of the reference geometries 44, 46. Based on the above example, the pre-defined information comprises for example a pre-defined distance 58 and 60 being representative for a desired relative position of the mark 34 and the pre-printed element 18. For the purpose of this evaluation, the marking station 12 shown in FIG. 1 may comprise a controller 62, wherein the pre-defined geometric relationship is stored. The controller may receive 64 the acquired picture form the camera 42 and perform the above described determination and evaluation operations.

In a sixth step, there are two alternatives. If the result of the evaluation is that the determined geometric relationship 56 matches the pre-defined geometric relationship, subsequent marks 34 are manufactured under removal of the pre-printed element 18 in the same pre-defined sections 32, as illustrated in FIG. 3.

If the result of the evaluation is that the determined geometric relationship 56 does not match the pre-defined geometric relationship, subsequent marks 34 are manufactured under adjustment of the pre-definition of the sections 32, wherein the pre-printed element 18 is removed. This adjustment may be done by adjustment of the position of the laser unit 38 in transverse and/or longitudinal direction compared to the direction of the block arrow in the lower right of FIG. 1 (The flow direction of the packaging material (16)). For that purpose, the controller 62 may submit 66 respective control data to the laser unit 38. In a possible alternative, the longitudinal adjustment, in other words adjustment in the block arrow direction, maybe achieved by controlling flow speed of the packaging material (16) and/or maybe achieved by adjusting the trigger signal delay time of the laser unit 38.

Preferably, subsequent marks 34 are manufactured at least until the determined geometric relationship 56 matches the pre-defined geometric relationship.

Preferably, the same camera 42 is used to evaluate at least one additional pre-defined quality feature of the manufactured mark 34. Based on the above example and with reference to FIG. 3, this may comprise assessment of readability of information represented by the two-dimensional code 36.

After the packaging material 16 has been marked according to the above method, it may be introduced to subsequent manufacturing steps in the direction of the shown block arrow. For example, a packaging container may be manufactured from the packaging material 16.

From the description above follows that, although various embodiments of the invention have been described and shown, the invention is not restricted thereto, but may also be embodied in other ways within the scope of the subject-matter defined in the following claims.

REFERENCE SIGNS

10 packaging material manufacturing system
12 marking station
14 décor printing station
16 packaging material
18 pre-printed element
20 pre-defined position
22 storage
24*a-d* flexo printing units
26*a-d* plate cylinders
28*a-d* impression cylinders
30 drying unit
32 pre-defined section
34 mark
36 two-dimensional code
38 laser unit
40 laser beam
42 camera
44 reference geometry
46 reference geometry
48 horizontal edge
50 vertical edge
52 horizontal edge
54 vertical edge
56 geometric relationship
58 distance
60 distance
62 controller
64 receive
66 submit

The invention claimed is:

1. A method of manufacturing a mark on a packaging material, the method comprising the following steps:
- providing the packaging material, which comprises a pre-printed element at a pre-defined position;
- removing the pre-printed element in pre-defined sections in a marking station, so that the removed sections reflect a negative of the mark to be manufactured;
- detecting a reference geometry of the pre-printed element and a reference geometry of the negative of the mark;
- determining a geometric relationship between the detected reference geometries;
- evaluating if the determined geometric relationship matches a pre-defined geometric relationship; and
- if the determined geometric relationship matches the pre-defined geometric relationship, manufacturing subsequent marks by removing subsequent pre-printed elements in the same pre-defined sections, or
- if the determined geometric relationship does not match the pre-defined geometric relationship, manufacturing subsequent marks by adjusting the pre-defined sections where subsequent pre-printed elements are removed.

2. The method according to claim 1, wherein the subsequent marks are manufactured at least until the determined geometric relationship matches the pre-defined geometric relationship.

3. The method according to claim 1, wherein a camera is used to detect the reference geometry of the pre-printed element and the reference geometry of the negative of the mark.

4. The method according to claim 3, wherein the camera is used to evaluate at least one additional pre-defined quality feature of the negative of the mark.

5. The method according to claim 1, wherein the negative of the mark comprises a two-dimensional code.

6. The method according to claim 5, wherein the at least one additional pre-defined quality feature comprises readability of information represented by the two-dimensional code.

7. The method according to claim 1, wherein the determined geometric relationship comprises detected information regarding a relative position and/or a relative orientation of the reference geometries and the pre-defined geometric relationship comprises pre-defined information regarding the relative position and/or the relative orientation of the reference geometries.

8. The method according to claim 1, wherein the reference geometries of the pre-printed element and the negative of the mark are of the same geometrical type.

9. The method according to claim 1, wherein the removing of the pre-printed element in the pre-defined sections is performed by laser ablation.

10. The method according to claim 1, wherein at least one element is pre-printed on the packaging material in a packaging material manufacturing system and then the packaging material comprising the pre-printed element is provided to the marking station.

11. A marking station, adapted and configured to manufacture a mark on a packaging material in a method according to claim 1.

12. A packaging material manufacturing system, comprising a marking station configured to manufacture a mark on a packaging material in a method according to claim 1.

13. The packaging material manufacturing system according to claim 12, further comprising a décor printing station adapted and configured to pre-print at least one element at a pre-defined position on a packaging material.

* * * * *